Dec. 8, 1970  L. PIEREDER  3,545,035
FRANKFURTER SEVERING MACHINE
Filed Nov. 21, 1967  7 Sheets-Sheet 2

Fig. 2

INVENTOR.
LUDWIG PIEREDER
BY
Kenyon & Kenyon
ATTORNEYS

United States Patent Office 3,545,035
Patented Dec. 8, 1970

3,545,035
FRANKFURTER SEVERING MACHINE
Ludwig Piereder, Jacques-Cartier, Quebec, Canada, assignor to Hygrade Food Products Corporation, Detroit, Mich., a corporation of New York
Filed Nov. 21, 1967, Ser. No. 684,668
Int. Cl. A22c *11/00*
U.S. Cl. 17—1                                  10 Claims

ABSTRACT OF THE DISCLOSURE

A machine to sever individual frankfurters from a chain of frankfurters at the junction of two adjacent frankfurters is disclosed. The chain of frankfurters is passed between parallel guide rollers and over idler rollers to be advanced through the machine by adjacent pairs of driven rollers. A sensing mechanism including a plurality of rollers is positioned with a portion of the plurality of rollers in contact with the outer surface of the frankfurters. When a junction between two adjacent frankfurters is reached, a sensing roller enters into the junction and thereby rotates a cam which is joined to the rollers. The cam upon rotation changes contact conditions in a switch which signals a switching relay to actuate a solenoid valve to advance and retract a piston. A knife connected to the piston through appropriate linkage then severs the junction between the frankfurters.

FIELD OF THE INVENTION

This invention relates to a machine for processing frankfurters, and more particularly to a machine for sequentially severing individual frankfurters from a chain of frankfurters.

In the manufacture of frankfurters a comminuted meat mixture is packed or stuffed into a predetermined length of suitable casing. The casing is quite long as it usually includes fifty to sixty frankfurters and is divided into a plurality of attached individual frankfurters by constricting a small section of the casing at intervals that correspond to the desired length of the individual frankfurters. The constricting of the sections of the casing is generally formed by wrapping string tightly around the casing. The chain of frankfurters is then processed by cooking. Prior to packaging, it is necessary to sever individual frankfurters from the chain of frankfurters at the constricted sections.

DESCRIPTION OF THE PRIOR ART

Heretofore the severing operation has been performed by hand. Since the wrap of string interferes with the cutting operation, hand cutting has been a slow and hence an expensive process. While there have been prior machines to sever individual frankfurters from a chain of frankfurters, none has proved to be a commercial success and as a result the operation is still done by hand.

One prior art machine for severing an individual frankfurter from a chain of frankfurters at the junction between two adjacent frankfurters, such as that shown in U.S. Pat. No. 3,156,006, issued on Nov. 10, 1964 employs a reciprocating carriage carrying a knife mechanism. When a sensing means, such as a sensing finger, senses the junction between adjacent frankfurters, the carriage is advanced to move the knife mechanism with the strip of frankfurters and while so moving, the knife mechanism is actuated to sever the junction between adjacent frankfurters. After actuation of the knife mechanism, the carriage is returned and held for the next cycle of advancement and cutting. While the machine of the patent is capable of cutting one frankfurter from the next, the machine of the patent requires the complexity and close timing necessary to operate the knife carriage and to cut while the carriage advances. Because of the need to reciprocate the carriage, clutch means and braking means are needed to successfully move the carriage through its cycle of travel. Similarly the reciprocatory motion of the carriage can cause a definite limit to the cyclic rate of the machine due to possibly high inertia loads accompanying the reciprocating motion. The sensing finger of the aforementioned prior art machine senses the upper surface of the string of frankfurters. When the finger descends into the junction between adjacent frankfurters, the sensing finger actuates the advancement of the carriage and the severing cycle. Since the thickness of the frankfurters can vary extensively, it is possible for the sensing finger to give a false signal or no signal unless carefully adjusted for each different thickness of frankfurters.

SUMMARY OF THE INVENTION

It is therefore an object of the present invention to provide a machine capable of rapidly and consistently severing individual frankfurters from a chain of frankfurters at the junctions between adjacent frankfurters as the chain continues to advance.

Another object of the invention is to provide a machine capable of severing individual frankfurters of varying thicknesses from a chain of frankfurters.

It is still another object of the invention to provide an automatic machine for severing individual frankfurters from a chain of frankfurters with a minimum of operator attention.

An additional object of the invention is to provide a machine for severing individual frankfurters from a chain of frankfurters by means of a cutting device operating at a fixed cutting station.

A further object of the present invention is to provide a machine to sever individual frankfurters from a chain of frankfurters which is convenient to use and which is safe for the operator.

Another object of the invention is to provide a machine to sever individual frankfurters from a chain of frankfurters that can continuously move the chain of frankfurters through the machine, even as cutting takes place, to allow for high production rates.

Briefly, in accordance with the present invention, the foregoing and other objects are accomplished by having adjacent pairs of rollers drive a chain of frankfurters through the machine. A sensing means that is disposed adjacent to the path the frankfurters traverse through the machine senses the arrival of the necked junction between two adjacent frankfurters in the chain. The sensing means actuates a knife through suitable linkage to sever an individual frankfurter from the chain of frankfurters at the junction between two adjacent frankfurters.

BRIEF DESCRIPTION OF THE DRAWINGS

Other objects will be apparent from the specification and drawings in which:

FIG. 9 is a side elevational view of the drive mechanism for the cutting means.

DESCRIPTION OF THE PREFERRED EMBODIMENT

Figure 1:
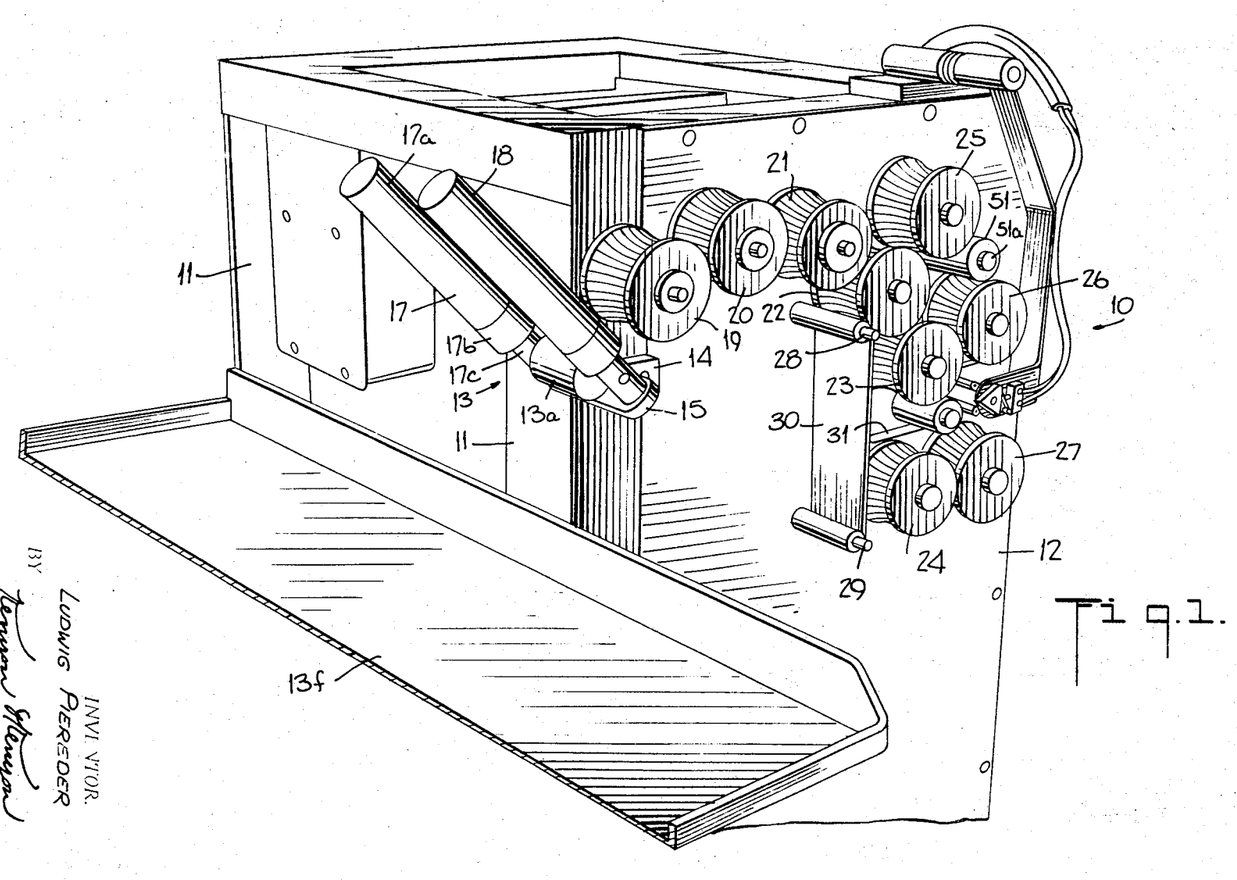
FIG. 1 is a perspective view of an embodiment of the invention.

Referring to the drawings, and more particularly to FIG. 1, a frankfurter cutting machine 10 is shown including vertical supports 11. Attached to two of the vertical supports and slightly below the top of the machine is a frankfurter chain receiving tray 13f. A plate 12 is attached to one side of the machine and serves to seal the interior of the machine on that side.

Figure 2:
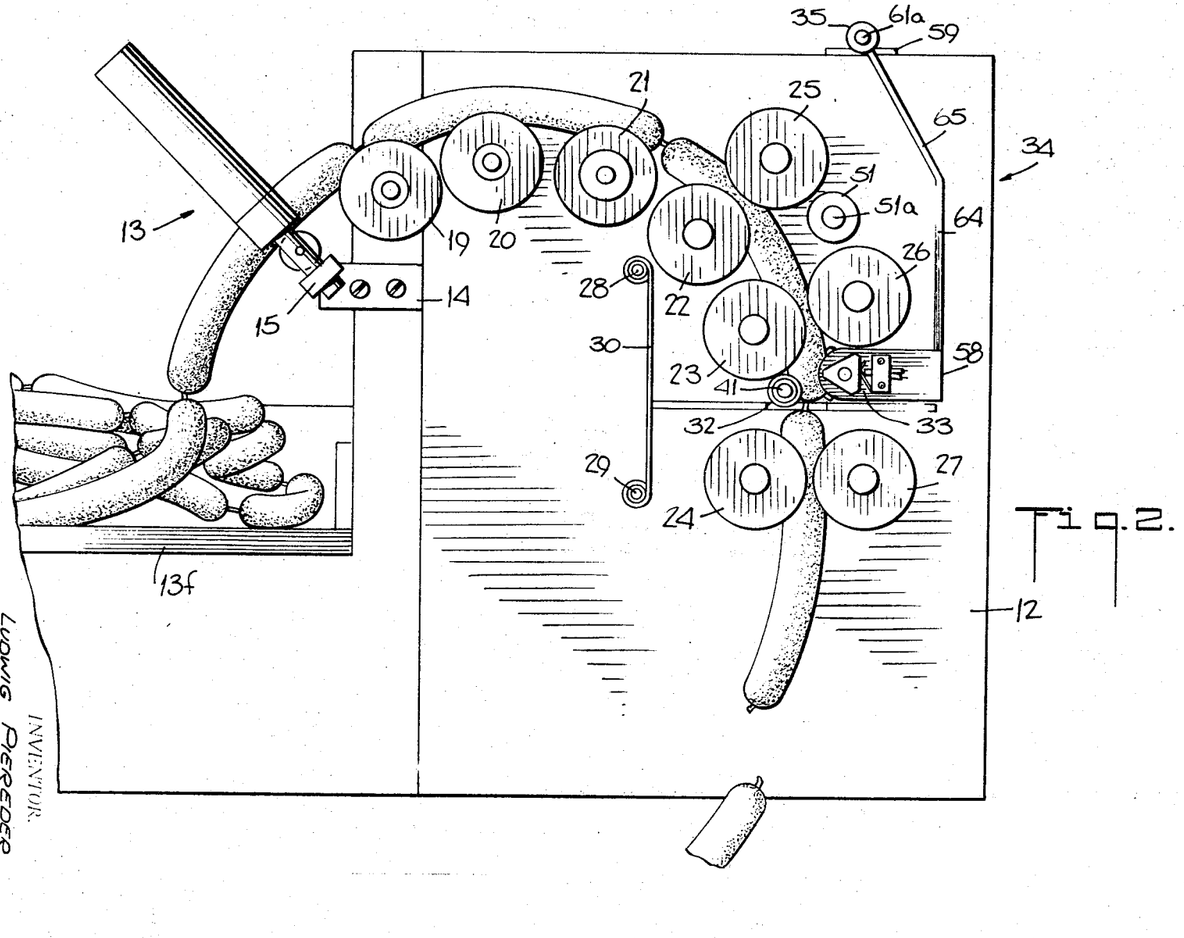
FIG. 2 is a side elevational view of the embodiment of the invention shown in FIG. 1 and shows the means to sense a junction between adjacent frankfurters.

Attached to machine 10, and on the same side of the machine as plate 12, is a guide mechanism 13. A base member 14 of guide mechanism 13 is attached to a vertical support by conventional fastening means as seen in FIG. 2. Attached to base member 14 is a support plate 15 to which are attached a pair of parallel guides 17 and 18 (FIG. 1). Guides 17 and 18 are identical to each other so a description of one guide will be sufficient. Guide 17 includes a top portion 17a which is rotatably attached by any of the conventional means to a bottom portion 17b. Bottom portion 17b includes a thin section 17c which is attached to plate 15 by any of the conventional means such as a screw extending from the bottom of plate 15 into bottom section 17c. A freely rotatable guide roller 13a is mounted perpendicular to guides 17 and 18 and attached to the bottom section of each guide.

As seen in FIG. 1 adjacent to guide mechanism 13 is a series of six serrated rollers 19–24. Rollers 19–21 are idler rollers and attached by conventional means to plate 12 so as to be freely rotatable. Rollers 22–24 are driven and adjacent to rollers 22–24 are a second series of driven rollers, 25–27, respectively. The drive means for each of rollers 22–27 includes a shaft for each roller which extends through plate 12 and will later be more fully explained. Each of rollers 19–27 is relieved or grooved on its circumference so as to receive and guide the frankfurters that are fed through the machine.

A knife slit 31 (FIG. 2) extends horizontally across the machine and is located slightly above rollers 24 and 27. A plate 30 is mounted adjacent to slit 31 and is joined to plate 12 by studs 28 and 29 which extend through the curved end sections of plate 30. An idler frankfurter guide roller 32, preferably made of plastic material, such as nylon, is rotatably mounted on plate 12 by a pin 41 slightly above slit 31. Another idler guide roller 51, also preferably of nylon, is mounted between rollers 25 and 26 and is joined to plate 12 by a pin 51a so as to be rotatable thereabout.

A frankfurther junction sensing mechanism 33 is mounted on end 58 of a bracket 34. Bracket 34 is attached to a cylindrical member 61a which is rotatably mounted inside a second cylindrical member 35. The bracket is biased toward idler roller 32 by a spring 61 (FIG. 3) bearing against cylindrical member 61a in a clockwise direction as viewed in FIG. 3. Second cylindrical member 35 is attached by conventional means to a block 59 which is mounted on the top of machine 10. As can clearly be seen in FIG. 2, bracket 34 includes a section 65 which is joined or integral with cylindrical member 61a and second section 64 which is at an angle to section 65. End 58 is perpendicular to section 64 at its lowermost point and in a different plane from section 64.

Figure 3:
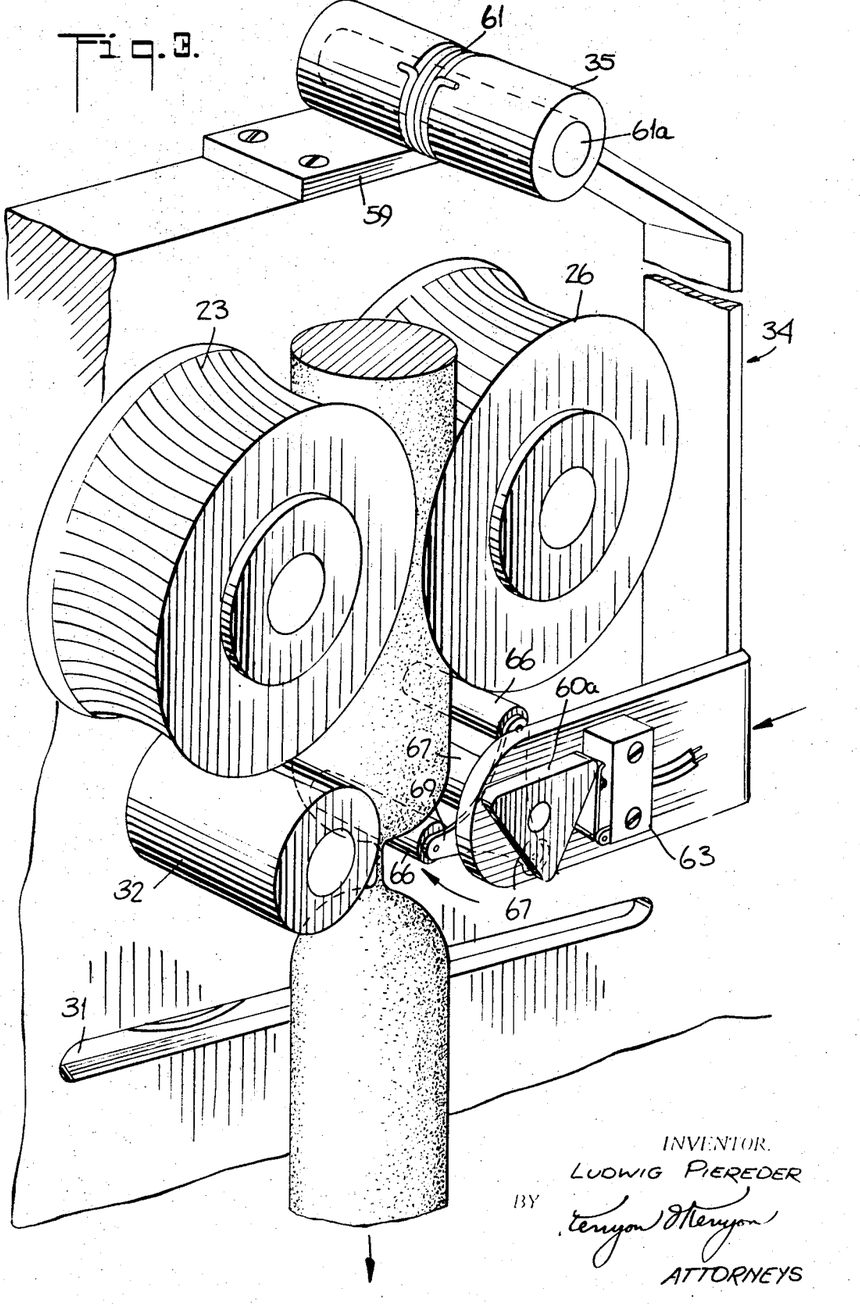
FIG. 3 is an enlarged view of the means to sense a junction between adjacent frankfurters.
Figures 5, 6, 7, 8:
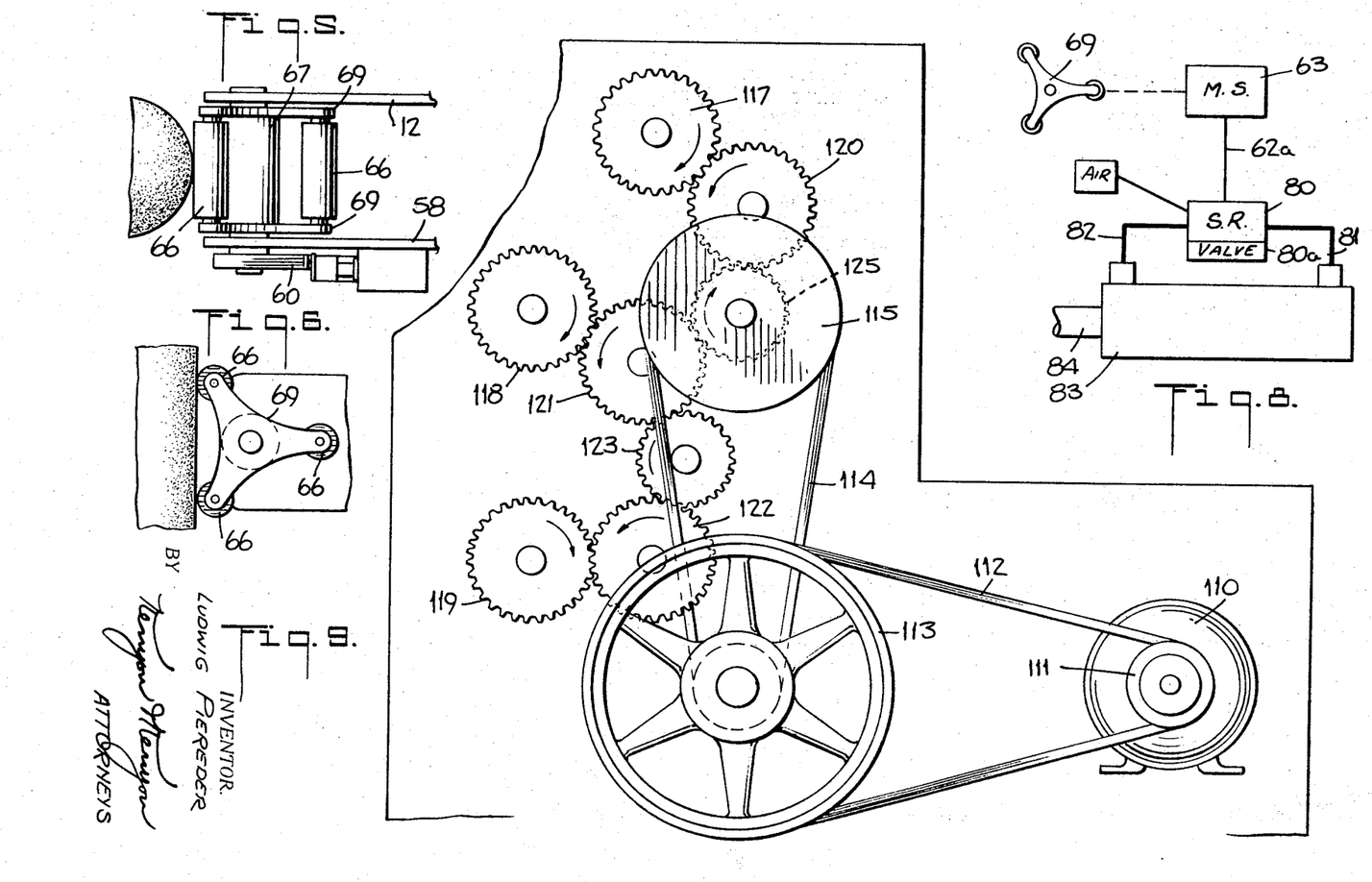
FIG. 5 is a fragmentary plan view of the sensing means shown in FIG. 3.
FIG. 6 is a fragmentary elevational view of the sensing means.
FIG. 7 is a fragmentary perspective view showing the drive mechanism for the cutting means.
FIG. 8 is a schematic drawing of the control means for activating the cutting means.
Figure 7:
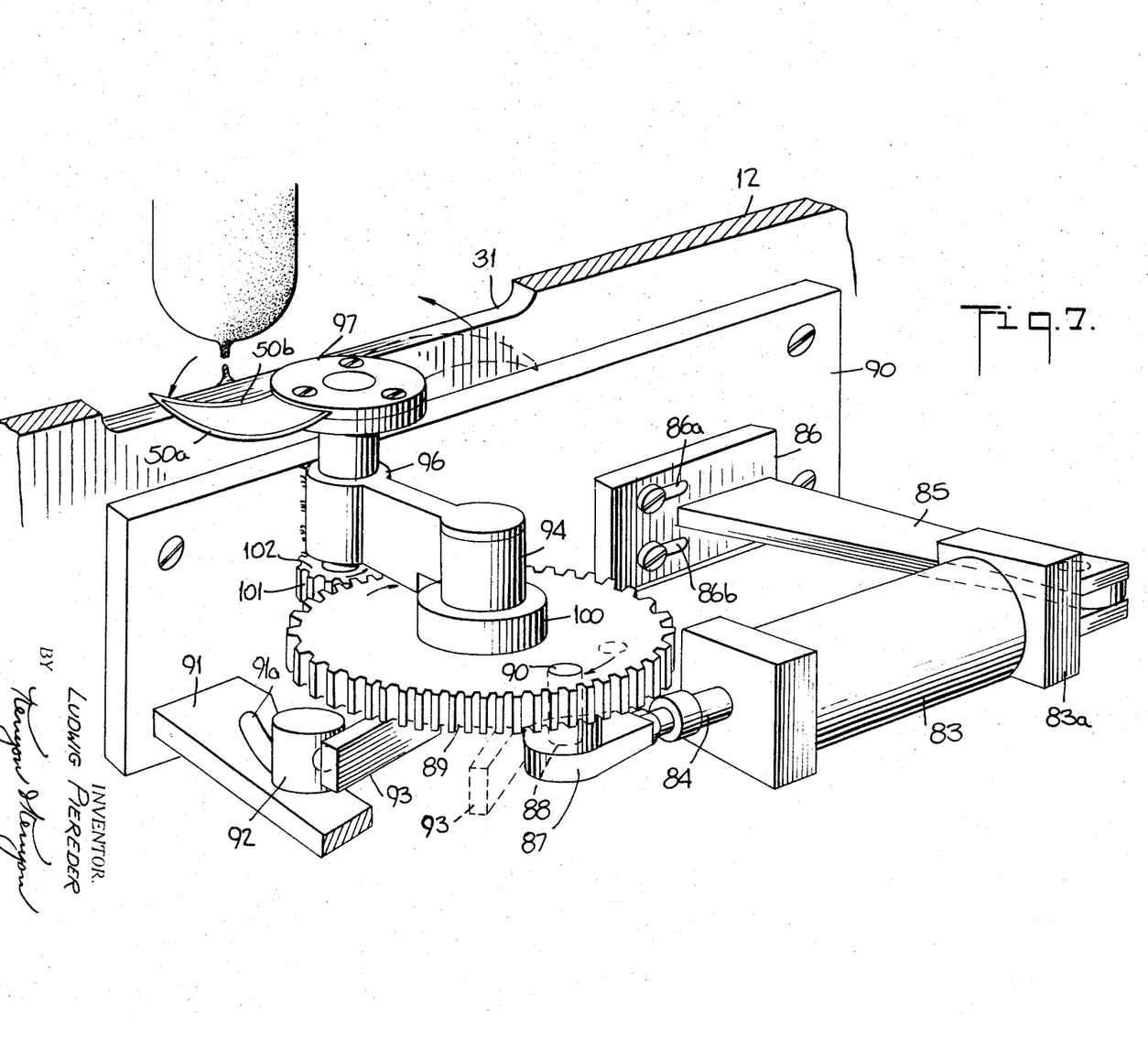

In FIG. 3 sensing mechanism 33 can be seen to include a triangularly shaped cam 60 which is located on the opposite side of end 58 from plate 12. Cam 60 receives at its center and is engaged to post 67. As a result cam 60 and post 67 rotate in unison. Post 67 passes rotatably through end 58 and through the center of a pair of identical triangular roller supports 69. Triangular roller supports 69 are parallel to each other and rotate with post 67. Preferably this can be accomplished by having the center of post 67 of a larger diameter section than the ends of the post (FIG. 5). Thus both triangular roller supports 69 can pass over the respective necked-down ends of post 67 to abut against the larger diameter center section. To insure that triangular roller supports 69 rotate with post 67, the supports can be press fitted over the necked-down ends of post 67 or keyed thereto. The end of post 67 disposed opposite to end 58 is rotatably mounted with respect to plate 12.

Triangular roller supports 69 are positioned on post 67 to be in alignment with each other. Three identical rollers 66, preferably of nylon, are pivotally mounted adjacent to the corresponding apexes of triangular roller supports 69. Thus, post 67, each triangular roller support 69, the rollers thereon and triangular cam 60 can rotate in unison about a central axis passing through post 67, while rollers 66 are free to rotate about their own axis.

Figure 4:
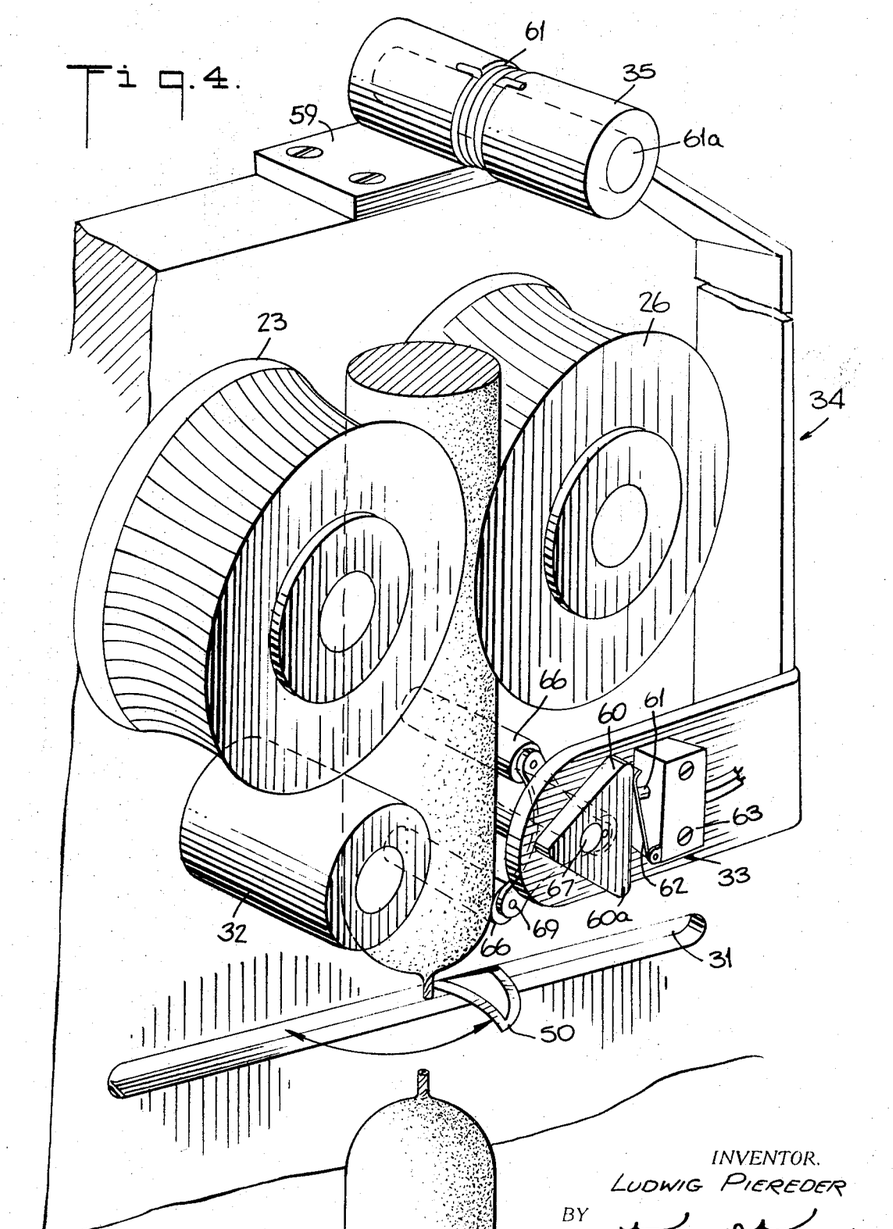
FIG. 4 is a fragmentary perspective view of the cutting station of the machine and shows an individual frankfurter being severed from an adjacent frankfurter.

Cam 60 in normal operation is positioned so that one of sides 60a thereof is disposed in a substantially vertical position (FIG. 4) with two rollers 66 disposed in another vertical plane. Adjacent to cam 67 is a switch 63 which is attached to end 58 of bracket 34. Switch 63 includes a lever 62 disposed adjacent to cam 60. Lever 62 can change contact conditions in the switch by depressing pin 61. Thus when cam 60 is rotated in a counterclockwise direction as viewed in FIG. 4, lever 62 is moved to the right by cam 60 thereby depressing pin 61. In this way the contact conditions within switch 63 are changed.

As can be seen in FIG. 8 switch 63 is connected by wires 62a to a switching relay 80. Switching relay 80 controls a solenoid valve 80a which is connected to a source of air pressure. The solenoid valve is connected by conduits 81 and 82 to cylinder 83 which houses a piston (not shown) having a piston rod 84. When switch 63 has its contact conditions changed by pin 61 being depressed, the switching relay will receive a signal and will actuate the solenoid valve to direct a pulse of pressure either to lines 81 or 82. When the contact conditions in switch 63 are again changed the switch will actuate the solenoid valve to direct a pulse of pressure to the line not previously energized.

In FIG 7, a frankfurter cutting knife 50, with cutting edges 50a and 50b is shown with a path of travel from one precutting position shown in dotted lines to another precutting position shown in solid lines. During this travel, the knife will pass through slit 31 and sever an individual frankfurter from the chain of frankfurters. When the knife returns to the position shown in dotted lines cutting edge 50b will sever another frankfurter. Cylinder 83 at end 83a is pivotally connected to bracket 85, the latter including a flat end 86 having slots 86a and 86b. Screws in slots 86a and 86b attach flat end 86 to a plate 90. By varying the position of the screws in slots 86a and 86b, the position of end 86 relative to plate 90 can be varied. Plate 90 is attached to the inside surface of plate 12 just below slit 31.

Piston rod 84 at its outermost extremity is attached to rod end 87 which is threadedly connected to rod 84. Shaft 88 pivotally connects rod end 87 to hole 90 in gear 89 so as to be able to drive gear 89. Gear 89 rotates about a shaft (not shown) which extends from below the gear, through the gear, and rotatably through a collar 100 and a cap 94. A bracket 91 extends perpendicularly from plate 90 and is positioned slightly below gear 89 and to the opposite side thereof from cylinder 83. Bracket 91 includes a curved slot 91a in which a stop 92 travels. Stop 92 is held rigid in slot 91a by a screw and nut (not shown) positioned below bracket 91 with the screw extending into stop 92. By releasing the screw and nut and moving with respect to slot 91a, the stop can have a plurality of positions relative to gear 89.

Attached to the bottom of gear 89 so as to rotate with the gear is arm 93. Arm 93 extends in such a manner that upon the proper rotation of gear 89 in the cutting portion of the cycle in FIG. 7, the arm is in an abutting relation with stop 92. In this way the rotation of gear 89 is limited. Gear 101, which is much smaller than gear 89, is in mesh with gear 89 and is keyed to a shaft 102 which extends through the center of gear 101. A collar 96 attached to cap 94 surrounds shaft 102 but does not rotate with the shaft and is joined to plate 90. Shaft 102 extends through the top of collar 96 to rotate hub 97. Shaft 102 at its other end is rotatably supported in the machine.

Prior to the cutting of a frankfurter knife 50 can be in either the dotted or solid position illustrated but will be described in the dotted position for illustrative purposes. With knife 50 in the position shown in dotted lines in FIG. 7 and arm 93 as illustrated piston rod 84 is in a retracted position. When cylinder 83 is pressurized by line 81 receiving fluid under pressure, piston rod 84 will extend allowing pivot element 87 and shaft 88 to rotate gear 89 in a clockwise direction, looking down at the gear in FIG. 7. Gear 89 will rotate until arm 93 has moved from the position shown in dotted lines to the position shown in solid lines in FIG. 7 where the arm abuts stop 92. As a result further rotation of gear 89 will not be possible. Rotation of gear 89 rotates gear 101 in a counterclockwise direction (looking down at gear 101 in FIG. 7). In response shaft 102 is rotated a sufficient distance to move knife 50 from the position shown in dotted lines to sever a frankfurter to the position shown in solid lines. When cylinder 83 is pressurized to retract piston rod 84, after the frankfurters have advanced to a position so another function is adjacent slit 31, knife 50 reverses its previous direction of travel to the position shown in dotted lines and severs another frankfurter. As piston rod 84 is retracted, gear 101 will rotate in a clockwise direction and gear 89 in a counterclockwise direction (looking down at both gears) and arm 93 returns to the position shown in dotted lines.

In FIG. 9 the drive for the driven rollers in FIGS. 1 and 2 is shown. Rollers 22–27 (FIG. 10) are all driven so as to advance the chain of frankfurters held between them to a position where they can be cut at their necked junction by knife 50 extending through slit 31. Roller 25 is keyed to rotate with gear 117, roller 26 is keyed to rotate with gear 118 and roller 27 is keyed to rotate with gear 119 (FIG. 9). In addition roller 22 is keyed to rotate with gear 120, roller 23 is keyed to rotate with gear 121 and roller 24 is keyed to rotate with gear 122, each by having a keyed shaft extend from the respective gear rotatably through plate 12 to the respective roller, or by other conventional means. Rollers 19–21 (FIG. 2) are idler rollers; they are not driven. These are rollers pivotally mounted with respect to plate 12.

A conventional electric motor 110 (FIG. 9) having drive pulley 111 provides the driving means for the rollers. A larger driver pulley 113 is spaced a short distance from pulley 111 and is rotatably connected to pulley 111 by a belt 112. A third pulley 115 is connected to gear 125 and is rotatably connected to pulley 113 by a belt 114. Gears 120 and 121 are in mesh with and driven by gear 125. Gears 117 and 118 are in mesh with gears 120 and 121, respectively. An idler 123 is meshed with gear 121 and gear 122 with the latter gear being meshed with gear 119. Idlers 123 and 125 insure that gears 120, 121 and 122 rotate in the same direction. With gears 117–122 rotating in the directions shown in FIG. 9, rollers 22–24 will rotate in a clockwise direction with rollers 25–27 rotating in a counterclockwise direction. This arrangement enables a string of frankfurters to be driven from the opposite sides thereof by respective rollers through the machine.

While it is desirable that each frankfurter in a chain of frankfurters be the same thickness, this is not always the situation since some frankfurters will be thicker than others. If the distance between a corresponding set of driven rollers is fixed and less than the thickness of a frankfurter, the frankfurter would be crushed as it is advanced by the rollers. Similarly, if a frankfurter was to be somewhat thinner than the distance between corresponding driven rollers, the frankfurters would not be in contact with both rollers and as a result thereof would not be fed through the machine and a jam-up would result.

Figure 10:
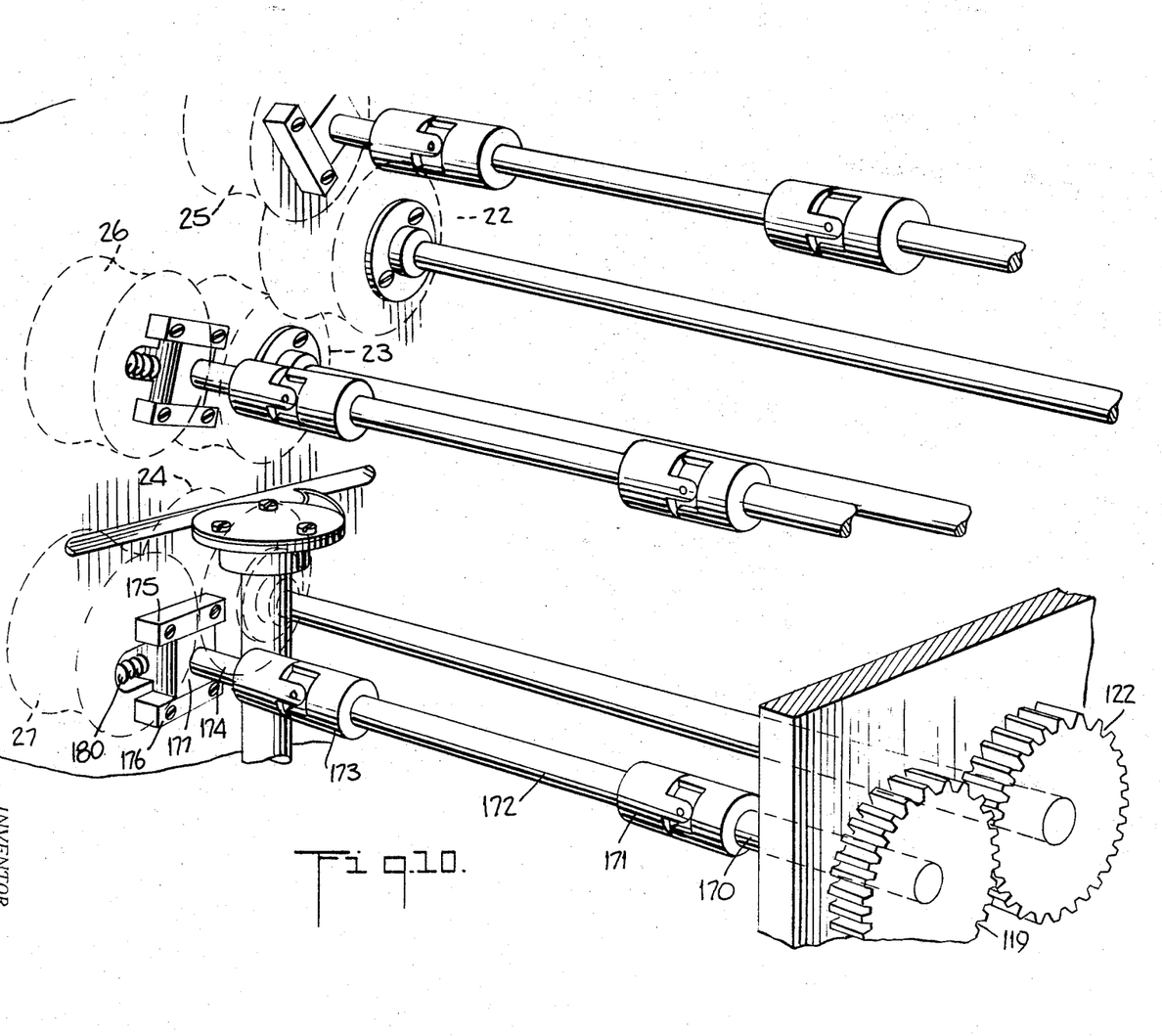
FIG. 10 is a fragmentary perspective view of the drive mechanism.

The most desirable condition would be if each roller in a pair of driven rollers were in contact with every frankfurter passing through the machine, regardless of the frankfurther thickness. In FIG. 10 I show means to accomplish this. Rollers 22, 23, 24 are rigidly fixed to the shafts and gears which drive them. Rollers 25, 26 and 27 each have lateral freedom and are each biased toward their corresponding roller to insure a proper contact between each pair of rollers and the frankfurters which pass between the rollers. Since the biasing means for each of rollers 25–27 are identical to each other, a description of the biasing means associated with roller 27 will be sufficient for an understanding of the invention.

Gear 119 is connected to universal joint 171 by a shaft 170. A shaft 172 connects universal joint 171 to a second universal joint 173, the latter being connected to rotate roller 27 by shaft 174. Attached to plate 12 are a pair of identical L-shaped guides 175 and 176 with guide 175 having its short side facing down and guide 176 being a flat L with its short side up, both short sides in alignment with each other. A block 177 slides between guides 175 and 176 and plate 12. Shaft 174 extends through block 177 so as to be able to rotate relative to the block. A spring 180 is fixed to the machine at one end and biases block 177 towards roller 24 at its other end and thus also biases shaft 174 and roller 27 to the right as viewed in FIG. 10. With roller 27 biased to the right, the roller will always be in positive contact against a frankfurter that is passing between roller 27 and adjacent roller 24 thereby insuring that there will be a positive contact by both rollers 24 and 27 with each frankfurter passing through the machine. A similar result is obtained with rollers 23, 26 and rollers 22, 25. Thus it can be seen that the universal joints enable the rollers 25, 26 and 27 to have the necessary lateral movement determined by the frankfurter thickness. Without the universal coupling it would not be possible to transmit torque to the laterally moving roller.

OPERATION

The human operator first places a chain of frankfurters on tray 13f and then takes one end of the chain and places it between guides 17 and 18. The operator then pases the end of the chain over rollers 19–21 as seen in FIG. 2 and in between driven rollers 22 and 25. When the power is turned on, rollers 22 and 25 are rotated in a clockwise and counterclockwise direction, respectively. The frankfurters are then advanced to rollers 23 and 26. Guide 51 insures that when a free end of a chain is inserted between rollers 22 and 25, the end will not pass between rollers 25 and 26 but instead will be directed by guide 51 to rollers 23 and 26.

As a frankfurter is advanced by rollers 25 and 26, two of rollers 66 are held against the side of the frankfurter (FIG. 6) since spring 61 biases cylinder 61a in a clockwise direction and therefore bracket 34 to the left (FIG. 1). As the frankfurthers are moving down between rollers 23 and 26, a junction between two frankfurters is reached by rollers 66 as viewed in FIG. 3. As a result the top of the two rollers, which were touching the side of the frankfurter, moves into the junction under the bias applied to bracket 34. This movement is accompanied by the rotation of member 69 and cam 60 in a counterclockwise direction as viewed in FIG. 3. In response cam 60 depresses lever 62 and pin 61 of switch 63 changing the contact conditions in the switch. The switch then sends a signal to switching relay 80 and the solenoid valve included therein which directs pressure to rapidly extend piston rod 84. Obviously if the rod were already extended it would be retracted.

When piston rod 84 is extended as viewed in FIG. 7, pivot element 87 and shaft 88 move to the left thereby rotating gear 89 in a clockwise direction looking down at the gear. A sufficient rotation of gear 89 in a clockwise direction moves arm 93, which rotates with the gear, into contact with stop 92 thereby stopping the rotation of the gear after a short clockwise travel. During the short clockwise travel of gear 89, gear 101 undergoes a larger counterclockwise travel because of the ratio of the diameters of the gears, preferably about 6:1, and moves knife 50 from the position shown in dotted lines through slit 31 to the position shown in solid lines which will cut the chain of frankfurters (FIG. 7). The knife will stay in this position with the piston rod extended until another junction is sensed. When another junction is sensed the contact conditions in cam switch 63 will be changed allowing gear 89 to rotate in a counterclockwise direction. At the same time gear 101 is moved in a clockwise direction which severs a frankfurter and returns the knife to the position shown in the dotted lines in FIG. 7.

This cutting operation occurs very rapidly and slightly after sensing means 63 senses a junctions between two adjacent frankfurters. The slight delay from the time the sensing means detects a junction between adjacent frankfurters and the cutting thereof enables the junction to be advanced to a position adjacent slit 31 where the knife will sever the frankfurter at the junction. If the frankfurters are of varying thickness, rollers 25–27 are able to move laterally to insure positive contact of all the driving rollers with the frankfurters and thereby insure a proper advancing thereof.

Plate 30 extends from plate 12 in a direction normal thereto for a distance slightly greater than the distance knife 50 passes through slot 31 when severing a frankfurter. This provision acts as a safety feature in keeping the operator's hand or arms from entering the cutting area.

Guide mechanism 13 insures a smooth feeding of frankfurters to the rollers and the serrations of the rollers provide a good friction surface with which to advance the frankfurters. If it is desired to change the length of travel of knife 50, the position of shaft 92 (FIG. 7) in slot 91 can be changed along with the position of end 86 relative to plate 90 to alter the travel of gear 89 and thereby the time required for the knife to cut the junction.

While I have illustrated a curved path that the frankfurters traverse through the machine it is obvious that if frankfurters having a straight surface are used the rollers on plate 12 could be positioned to pass the frankfurters through the machine in a straight path.

Having described what I believe to be the best embodiment of my invention I do not wish to be limited by what I have disclosed therein but instead by what is set forth in the appended claims.

What is claimed is:

1. A machine for severing frankfurters from a string of frankfurters at the junction between adjacent frankfurters of the string comprising:
 (a) means for continuously advancing a string of frankfurters along a predetermined path extending through the machine;
 (b) means mounted adjacent to a predetermined location disposed adjacent to the predetermined path for sensing the presence of a junction between adjacent frankfurters; and
 (c) means stationarily mounted at the predetermined location and connected to said sensing means for severing a frankfurter from the frankfurter of the string adjacent thereto in response to the sensing by said sensing means the function between adjacent frankfurters;

said means mounted adjacent to a predetermined location disposed adjacent to the predetermined path for sensing the presence of a junction between adjacent frankfurters including:
 (i) a plurality of members adapted to successively engage the surface of the frankfurters;
 (ii) means supporting said plurality of members at a uniform distance from one another at a common radius and with respect to a central axis for rotation of said plurality of members about the central axis; the central axis extending at substantially right angles to the length of the predetermined path, said supporting means rotating with said plurality of members about the central axis whenever one of said plurality of members passes into the junction between adjacent frankfurters; and
 (iii) means responsive to rotation of said supporting means for providing an output corresponding to the presence of a junction between adjacent frankfurters adjacent to the predetermined location.

2. A machine in accordance with claim 1 wherein said plurality of members includes at least two rollers, each of said rollers having an axis passing through said roller and each of said rollers being rotatable about its respective axis and the central axis.

3. A machine in accordance with claim 2 wherein means bias said rollers so at least two of said rollers are in touching relation with the string of frankfurters passing through the machine.

4. A machine in accordance with claim 3 wherein said means responsive to rotation of said support means for providing an output corresponding to the presence of a junction between adjacent frankfurters comprises an actuating member rotatable with said support member, and means actuated by rotating said actuating member for starting said means for severing a frankfurter from the frankfurter adjacent thereto into a severing motion.

5. A machine in accordance with claim 4 wherein said actuating member is a cam and said means for starting said severing means into a serving motion is a switch which has its contact conditions changed upon rotation of said cam.

6. A machine in accordance with claim 5 wherein a switching relay is connected to and controlled by said switch, a solenoid valve controlled by said switching relay, a cylinder housing a piston controlled by said solenoid valve, and linkage connecting said piston to said means for severing a frankfurter from the frankfurter of the string adjacent thereto.

7. A machine in accordance with claim 6 wherein gearing is connected to said piston rod, said means for severing a frankfurter from the frankfurter in the string adjacent thereto is connected to said gearing, and means are movable with said gearing for varying the amount of rotation possible of said gearing.

8. A machine in accordance with claim 1 wherein the distance from the central axis to the surface of the frankfurters is less than said common radius.

9. Apparatus for sensing a discontinuity between adjacent articles in a string of articles having junctions between adjacent articles and for producing a signal indicative thereof comprising:
 three symmetrically attached sensing elements;
 means for biasing two of said sensing elements in contact with the surface of a string of articles having junctions between adjacent articles and which is passing adjacent the attached sensing elements and for urging one of the two sensing elements in contact with the surface of the string of articles into a junction between adjacent articles when the junction is at a specified location with respect to the two sensing elements in contact with the surface of the articles and for rotating the three sensing elements when one of said sensing element enters the junctions; and means for producing a signal upon the rotation of the three sensing elements.

10. A machine to sever individual frankfurters from a chain of frankfurters at the junction between adjacent frankfurters comprising means for advancing a chain of frankfurters through the machine along a predetermined path, sensing means including a plurality of rollers adapted to engage the surface of the frankfurters and to each sequentially sense the presense of a junction between adjacent frankfurters in the chain of frankfurters advancing through the machine, means for rotatably mounting each of said plurality of rollers at an equal distance from one another and at a common radius with respect to a common axis of rotation, the engagement of said rollers with the frankfurters when a junction between adjacent frankfurters is adjacent said rollers causing said plurality of rollers to be rotated about said common axis of rotation, means for severing adjacent frankfurters at the junction therebetween, and means responsive to rotation of said plurality of rollers with respect to the common axis of rotation when a junction between adjacent frankfurters is adjacent said plurality of rollers for actuating said severing means to sever a frankfurter at the junction.

References Cited

UNITED STATES PATENTS

| | | | |
|---|---|---|---|
| 2,463,157 | 3/1949 | Deitrickson | 17—1F |
| 2,676,354 | 4/1954 | Mosby | 17—1F |
| 2,670,498 | 3/1954 | Mosby | 17—1F |
| 3,156,006 | 11/1964 | Gouba | 17—1F |

LUCIE H. LAUDENSLAGER, Primary Examiner

U.S. Cl. X.R.

17—49